Figure 3:
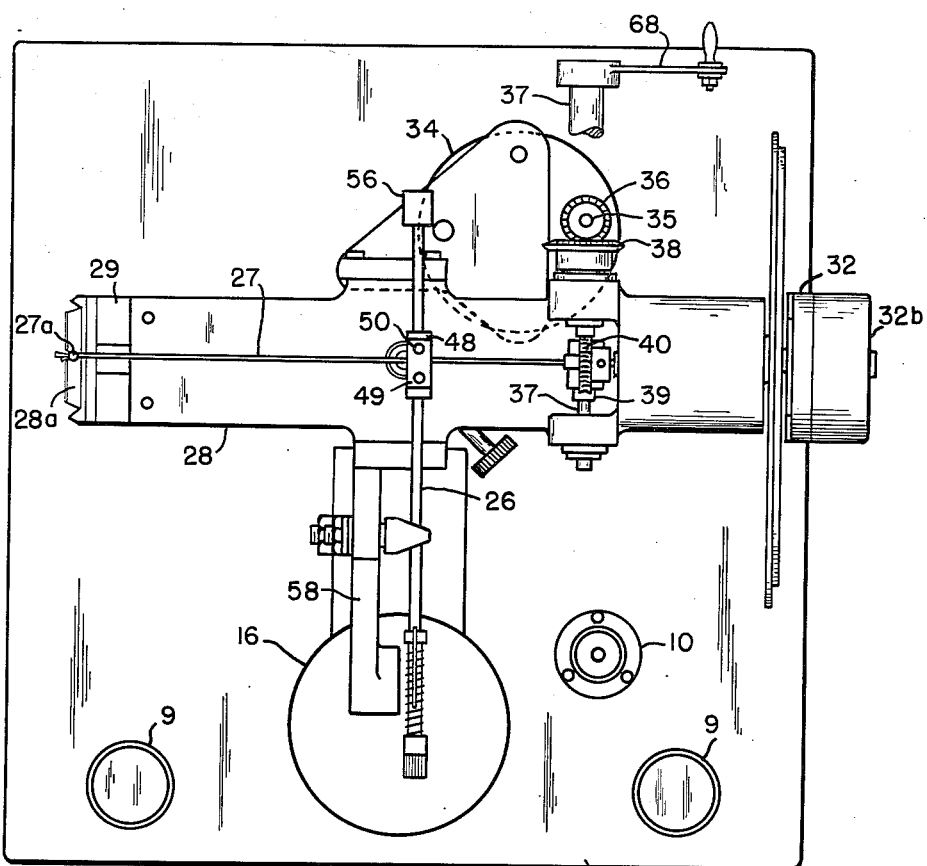

July 10, 1962 P. HENEAGE 3,043,131
TENSIOMETER
Filed March 22, 1960 3 Sheets-Sheet 1
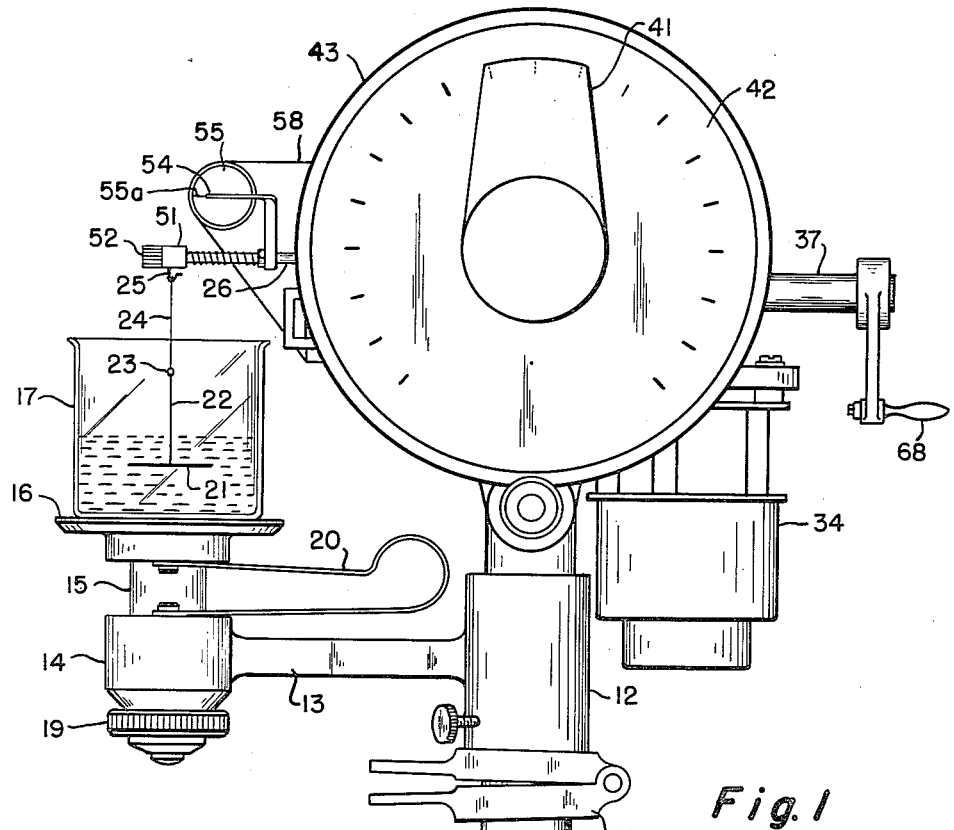
Fig. 1
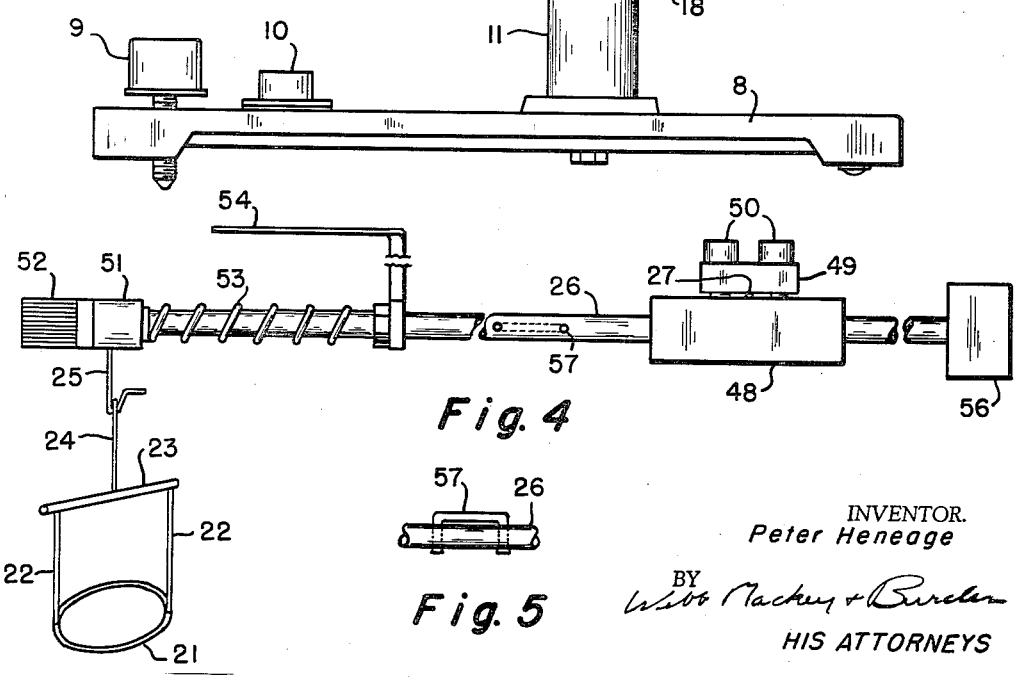
Fig. 4
Fig. 5
INVENTOR.
Peter Heneage
BY Webb, Mackey & Burden
HIS ATTORNEYS July 10, 1962    P. HENEAGE    3,043,131
TENSIOMETER
Filed March 22, 1960    3 Sheets-Sheet 2
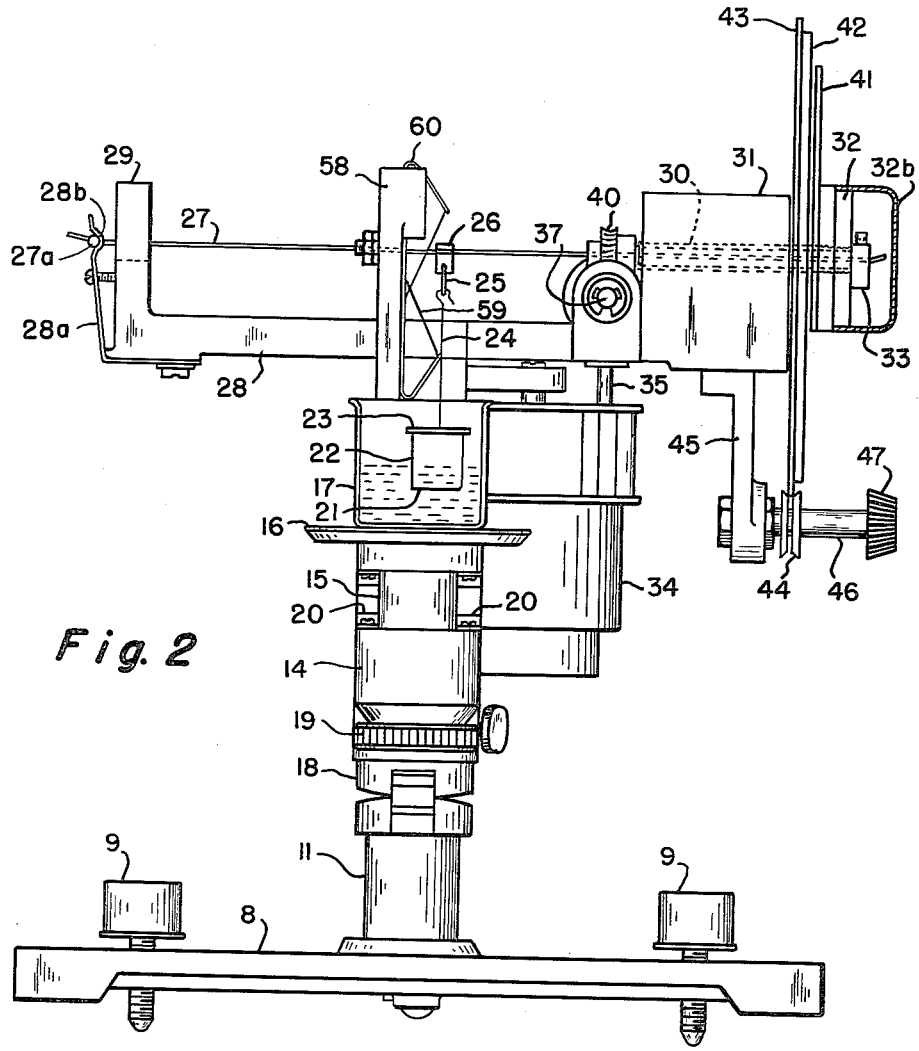
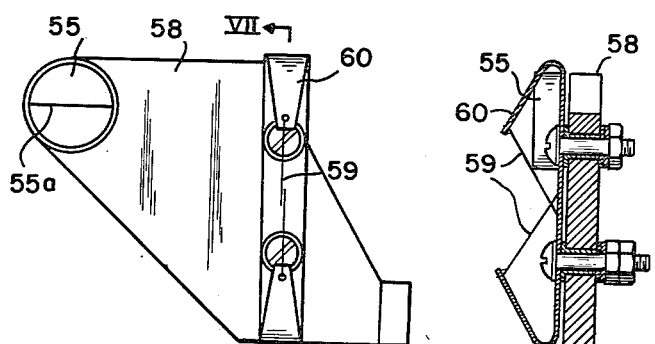
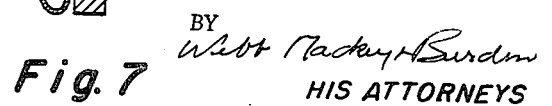
INVENTOR.
Peter Heneage
BY
Webb Mackey Burden
HIS ATTORNEYS July 10, 1962  P. HENEAGE  3,043,131
TENSIOMETER Filed March 22, 1960  3 Sheets-Sheet 3

INVENTOR.
Peter Heneage
BY
Watt Mackey & Burden
HIS ATTORNEYS

United States Patent Office 3,043,131
Patented July 10, 1962

3,043,131
TENSIOMETER
Peter Heneage, Pittsburgh, Pa., assignor to Fisher Scientific Company, Pittsburgh, Pa., a corporation of Pennsylvania
Filed Mar. 22, 1960, Ser. No. 16,757
3 Claims. (Cl. 73—53)

This application relates to a tensiometer, an instrument used for measuring the surface tension of liquids. More particularly, it relates to an instrument for measuring surface tensions whereby the procedures heretofore carried out manually can be done automatically with greater precision and with greater speed.

To measure the surface tension of a liquid in accordance with one known technique, a wire ring of predetermined diameter is suspended horizontally in the liquid above or below the surface, the tension of which is to be measured. The ring is then raised or lowered through the surface and the force involved in thus moving the ring is measured. In tensiometers used for carrying out this technique, the ring is suspended from an arm adjacent one end of the arm, and the arm is clamped between its ends to a tension wire at a point between the ends of the wire, which wire extends generally at right angles to the arm. One end of the wire is fixed; and at the other end of the wire, there is a mechanism for twisting the wire to apply a torsional stress to the wire which, in turn, will rotate the arm about the point where it is connected to the wire.

Depending upon the direction in which the wire is twisted, the arm will then raise or lower the ring in the liquid and move it through the surface to be tested. The operator also moves the beaker containing the liquid in one direction while he twists the wire in a direction to move the ring in the opposite direction. Movement of the beaker and of the wire is stopped as soon as the ring breaks through the surface. The amount that the wire has been turned is determined by a gauge; and from the known properties of the wire, the amount of force required to pull the ring through the surface of the liquid can be calculated. Alternatively, the gauge can be calibrated to read the surface tension directly.

The surface tension can also be measured by measuring the force required to move the ring downwardly through the surface. That is, the ring is moved into the liquid, the surface tension of which is to be measured through the surface in question. This procedure is generally used when it is desired to measure the surface tension of the interfacial surfaces of two liquids.

In my tensiometer, the above-described techniques are carried out automatically, producing more accurate results at greater speeds.

Figure 8:
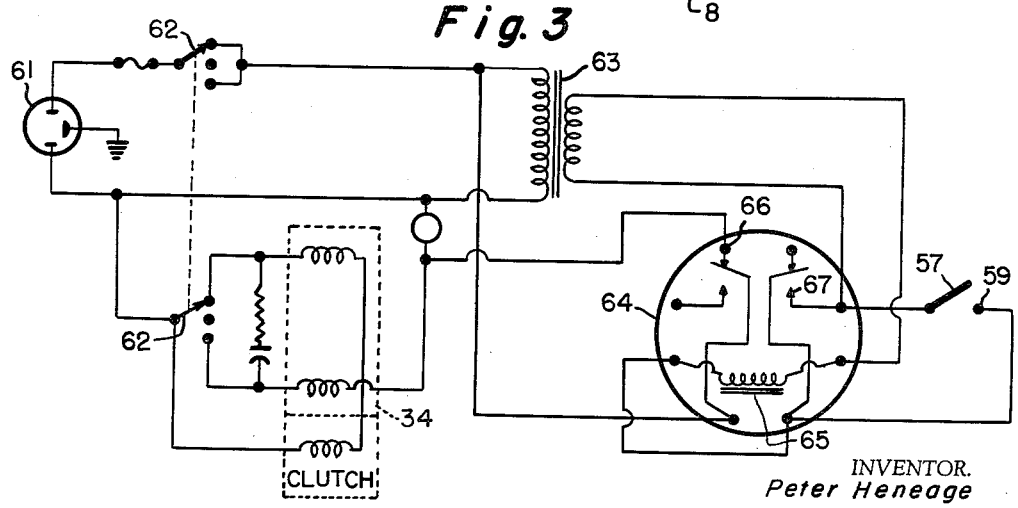

In the accompanying drawings, I have illustrated certain presently preferred embodiments of my invention, in which:

FIGURES 1 to 3 are front, side, and plan views, respectively, of my tensiometer;
FIGURE 4 is a front view of a balance arm used in the tensiometer;
FIGURE 5 is a partial plan view of the arm shown in FIGURE 4;
FIGURE 6 is a front elevation of a portion of the tensiometer;
FIGURE 7 is a section; along the lines VII—VII of FIGURE 6; and
FIGURE 8 is a diagram of the electric circuit of the tensiometer.

Referring to FIGURE 1 of the drawings, my tensiometer has a base 8 with leveling screws 9 and a float level 10. A vertical post 11 extends from the base and supports the framework for the instrument.

A sleeve 12 surrounds the post 11 and has a horizontally extending arm 13 at the outer end of which is a boss 14. A second post 15 is threaded into the boss 14 and carries a platform 16 on which is placed a beaker 17 which holds the liquid which is to be tested. The height of the beaker 17 can be adjusted by sliding the sleeve 12 up and down on the post 11 and locking it in position with the quick release clamp 18.

Minor adjustments in the height of the beaker are made by turning the post 15 in the boss 14 and locking it in position with the hand knob 19. A U-shaped spring 20 having its legs fastened to the boss 14 and to the underside of the platform 16 prevents backlash in the height adjustment of the post 15 and also keeps the platform 16 from turning.

As mentioned, a ring of predetermined diameter is pulled through the surface of a liquid to measure its surface tension. Such a ring is shown in FIGURE 4. It comprises a wire ring 21 supported by two wires 22 which extend vertically from the ring at opposite ends of a diameter and are fastened to a horizontal rod 23. A wire 24 extending from the middle of the rod 23 is looped over a hook 25 mounted on the end of a balance arm 26. The arm 26 is clamped at a point along its length to a tension wire 27 (see FIGURE 3).

A frame 28 carried by the post 11 has an upwardly extending end 29 through which one end of the wire 27 extends. The other end of the wire is secured to a hollow shaft 30 which may be turned, as will be later described, to twist the wire and pivot the arm 26 about the point where it is clamped to the wire and thus raise or lower the ring 21 in the liquid to be tested.

The frame 28 has at its end opposite to the end 29 a mounting block 31 in which the shaft 30 is mounted so that it can rotate about an axis in line with the axis of the wire 27. The wire extends through the shaft 30 and a hub 32 mounted on the outer end of the shaft 30. The end of the wire is held in the hub 32 by a clamp 33 forming part of the hub. Therefore, when the shaft 30 turns, the end of the wire 27 held in the clamp 33 also turns. A hub cap 32b covers the hub 32. The wire is held under tension by a flat spring 28a which bends around the end 29 of the frame and has a curved recess 28b which holds a bar 27a to which the end of the wire is fastened.

An electric motor 34 suspended from the frame 28 is provided to turn the shaft 30. The drive between the motor 34 and the shaft 30 comprises a motor shaft 35 having at its upper end a bevel gear 36 (see FIGURE 3). A shaft 37 mounted in the block 31 and extending at right angles to the shaft 30 has at one end a bevel gear 38 which meshes with the gear 36. The shaft 37 extends beneath the wire 27 and directly beneath the wire carries a worm gear 39. A pinion gear 40 is secured to the inner end of the shaft 30 and meshes with the worm gear 39. Therefore, when the motor 34 is energized, it will rotate the shaft 30 to twist or turn the end of the tension wire which is clamped at its outer end. The amount that the end of the wire is turned is shown by a vernier 41 and a scale 42. The vernier 41 is secured to the hub 32 and turns with it. The scale 42 is mounted on a backing plate 43 which rides on and is supported by a pulley 44. A bracket 45 extending down from the housing 31 carries a shaft 46 upon which the pulley 44 is mounted. The outer end of the shaft 46 has a hand knob 47 so that the pulley 44 can be turned to adjust the position of the scale 42.

FIGURE 4 shows how the arm 26 is clamped to the wire 27. The arm 26 carries a rectangular block 48 between its ends. The wire 27 is placed between the block 48 and a clamping bar 49, and the bar 49 is pressed against the block by two cap screws 50.

FIGURE 4 also shows how the hook 25 which carries the ring 21 is mounted on the arm 26. A sleeve 51 sliding on the arm 26 carries the hook 25. The end of the arm 26 is threaded and an adjusting nut 52 can be turned on the threaded portion to move the sleeve 51 along the arm. A spring 53 presses the sleeve 51 against the nut so that it will follow the nut.

The arm 26 also has a pointer 54 which with a mirror 55 is used to level the arm 26 at the start of a measurement and to indicate the end of a measurement, as will be later explained. The arm 26 also has a counterweight 56 on its end opposite to the end which carries the ring 21.

It has been explained that in a measurement of surface tension, movement of the ring relative to the liquid is stopped as soon as the ring breaks through the surface of the liquid. Therefore, in my tensiometer, it is necessary that the motor 34 be stopped at this point. To accomplish this, I include in the electrical circuit for the motor a switch which, when closed, activates a relay to stop the motor. The switch is activated by movement of the arm 26. That is, when the arm 26 has moved a sufficient distance to pull the ring 21 through the surface being measured, the switch is closed and the motor 34 is de-energized.

FIGURES 4 to 7, inclusive, show the switch. One contact of the switch is carried on the arm 26 and upon movement of the arm, this contact engages fixed contacts positioned on the frame of the instrument. Referring to FIGURES 4 and 5, the contact on the arm 26 comprises a U-shaped wire 57, the ends of which extend through the arm 26, the closed end of the wire extending parallel to one side of the arm 26 but being spaced a slight distance therefrom. A bracket 58 extending upwardly from the frame 28 carries the mirror 55 (see FIGURE 6) and also the mount for the fixed contacts which are engaged by the contact 57 when the arm 26 moves. There are two fixed contacts so that the switch which cuts off the motor will be closed if the arm 26 turns in either direction. As shown in FIGURES 6 and 7, the two contacts are provided by a single wire 59 which is mounted on a double-ended spring clip 60. The two ends of the clip 60 are bent toward each other and the wire 59 extends from one end of the clip to the center of the clip and then out to the other end of the clip. The clip 60 is bolted to the bracket 58 and is insulated from the bracket and from the rest of the instrument by insulating bushings and washers around the bolts. As shown in FIGURE 2, the clip 60 is mounted on the bracket 58 so that the wire 59 extends above and below the arm 26; and when the arm 26 raises or lowers the ring 21, the contact 57 carried on the arm will engage the wire 59 and then close the switch.

FIGURE 8 shows the electric circuit for driving the motor 34 and for controlling the motor by the switch formed by the contacts 57 and 59. A line cord 61 leads to a double-pole, double-throw switch 62 which is used to select the direction of rotation of the motor 34, and which has a center "off" position. The motor 34 is a standard reversible, synchronous clutch motor which is energized when the switch 62 is closed. Current is also supplied to a step-down transformer 63 which supplies current to operate a relay 64 when the switch 57—59 is closed. The relay 64 is spring-loaded to the position shown in FIGURE 8 and thereby complete the circuit to the motor 34. It will be seen that when the switch 57—59 is closed, the coil 65 in the relay will be energized to break the contact 66 which thereby cuts off the supply of current to the motor 34. At the same time, the contact 67 is closed which will energize the coil 65 and hold the relay in the open position (for the motor) until the switch 62 is put in the center "off" position.

The contact 57 mounted on the arm 26 is connected into the circuit by fastening one of the leads from the low voltage side of the transformer 63 to a part of the instrument. The contacts 59 are connected into the circuit by a lead running from one of the insulated bolts which hold the spring clip 60 to the bracket 58. The transformer 63 makes it possible to use a low voltage relay so that there is no danger of electrical shock to the operator and also arcing between the contacts 57 and 59 is minimized.

The motor 34 is a slow speed motor (preferably 8 r.p.m.) and, therefore, contains a speed reducing gear train. The motor also has an automatic clutch which disengages the motor drive shaft whenever the motor is not energized, so as to permit manual operation of the tensiometer. For manual operation, an extension of the shaft 37 carries a hand crank 68.

The operation of the tensiometer will now be described. The ring 21 is mounted on the arm 26 and the level of the beaker 17 is adjusted so that the ring is in the liquid to be tested but out of contact with the underside of the surface of the liquid. The arm 26 is then brought to zero position by lining up the pointer 54 with a mark 55a on the mirror 55 and the zero point on the dial 42 is lined up with the zero point on the vernier 41 by turning the knob 47. The platform 16 is then lowered so as to pull the ring down by the surface tension of the liquid. The platform is lowered to such a distance that the ring breaks away from the liquid when the arm is returned to the zero position. The switch 62 is closed to energize the motor 34 and turn the shaft 30. This twists the wire 27 and raises the arm 26. When the arm moves a short distance past the zero point, the contact 57 engages the wire 59 and thus closes the switch 57—59 and stops the motor 34. The amount that the wire has been turned is then read with the vernier 41 and scale 42. Preferably, the scale 42 is calibrated so that it reads directly in units used to express surface tension, i.e., dynes per centimeter.

My tensiometer makes it possible to make surface tension measurements much more rapidly than has heretofore been possible. Since the ring is pulled through the liquid by a steady motion from a synchronous motor, the results obtained are more accurate and more readily reproduceable than those obtained on a manually operated tensiometer in which the ring is moved relative to the liquid by hand.

While I have described a presently preferred embodiment of my invention, it is to be understood that it may be otherwise variously embodied within the scope of the appended claims.

I claim:

1. A tensiometer comprising a support for a container for the liquid the surface tension of which is to be measured, a ring positioned to be moved through a surface of said liquid, an arm supporting said ring from a point adjacent one end of the arm, a tension wire to which said arm is secured between the ends of the wire and between the ends of the arm, one end of said wire being fixedly mounted, a shaft mounted for rotation about an axis in line with the tension wire and having means for holding the other end of said wire, a motor operatively connected to said shaft to rotate the shaft and thereby apply a torsional stress to the wire tending to rotate the arm about the point where it is secured to the wire and move the ring through the liquid, an electrical circuit for supplying current to said motor, and a switch operated by movement of said arm to cut off the supply of current to the motor after the ring has moved through the surface to be tested, and means to indicate the amount of stress given to the wire by said motor.

2. A tensiometer as described in claim 1 in which said switch comprises a contact on said arm and a second contact positioned to be engaged by said arm contact when the ring has moved through the surface to be tested.

3. A tensiometer comprising a support for a container for the liquid to be tested, a ring positioned to be moved through liquid in the container, an arm supporting said ring from a point adjacent one end of the arm, a tension wire to which said arm is secured between the ends of the wire and between the ends of the arm, one end of said wire being fixedly mounted, wire-holding mechanism mounted for rotation about an axis in line with the tension wire and having means for holding the other end of said wire, a motor operatively connected to said wire-holding mechanism to rotate it and thereby apply a torsional stress to the wire tending to rotate the arm about the point where it is secured to the wire and move the ring through the liquid, means to indicate the amount of torsional stress to the wire, and an electrical circuit for supplying current to said motor, said circuit including a manually operated switch for controlling the supply of current, a second switch actuated by movement of said arm, and a relay controlled by said second switch, said relay also controlling the supply of current to the motor and having a holding circuit which when the relay is energized holds the relay in open position whereby, upon movement of said arm, the relay is actuated to cut off the supply of current to the motor and to actuate said holding circuit.

References Cited in the file of this patent

UNITED STATES PATENTS 2,756,587  Doble _____ July 31, 1956

FOREIGN PATENTS 462,316  Italy _____ Mar. 9, 1951

OTHER REFERENCES

Publication: Cenco News Chats, Winter 1951–52, pages 4–6.